United States Patent Office 3,219,627
Patented Nov. 23, 1965

3,219,627
LINEAR POLYESTERS OF 9,9-FLUORENEDICARBOXYLIC ACIDS AND A METHOD FOR THE PREPARATION THEREOF
Anthony A. D'Onofrio, Martinsville, N.J., assignor to Union Carbide Corporation, a corporation of New York
No Drawing. Filed June 30, 1961, Ser. No. 120,974
7 Claims. (Cl. 260—47)

This invention relates to linear, amorphous, thermoplastic polyesters and to a process for the preparation thereof. More particularly, this invention relates to linear, amorphous, thermoplastic polyesters which are the condensation products of (a) 9,9-fluorenedicarboxylic acids or the ester-forming derivatives of said acids, and (b) an organic dihydroxy compound or an ester of the dihydroxy compound.

The linear, amorphous, thermoplastic polyesters of this invention have a reduced viscosity in the range of from about 0.2 to about 3.5, and contain a plurality of recurring structural units of the general formula:

Formula I

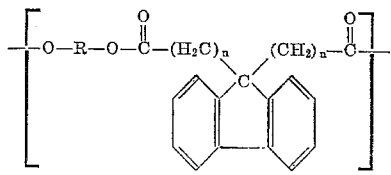

where $n$ is a positive integer having a value of from 1 to 3 inclusive, and R represents a divalent hydrocarbon radical which is the nucleus of an organic dihydroxy compound.

Reduced viscosity values noted herein were determined by forming a solution having a concentration of 0.2 gram of the linear, amorphous polyester per 100 milliliters of a mixture of 60 percent by weight phenol and 40 percent by weight tetrachloroethane. The time required for efflux of the solvent (60-40 percent by weight phenol and tetrachloroethane) and of the polyester solution through a viscosimeter was determined. Reduced viscosity was then calculated using the equation:

$$R.V. = \frac{T_1 - T_2}{T_2 C}$$

wherein:
$T_1$=the efflux time for the polyester solution,
$T_2$=the efflux time for the solvent,
$C$=the concentration of the polyester solution in grams of polyester per 100 milliliters of solvent.

As stated, the linear, amorphous, thermoplastic polyesters of this invention are produced from a 9,9-fluorenedicarboxylic acid or an ester-forming derivative of said acid and an organic dihydroxy compound or an ester of said dihydroxy compound.

Any organic dihydroxy compound or ester thereof, including monoesters and diesters, can be used to prepare the linear amorphous polyesters of this invention. These materials can be represented by the general formula:

Formula II $$R_1O—R—OR_2$$

wherein $R_1$ and $R_2$, which can be the same or different, are hydrogen or an acyl radical, i.e.,

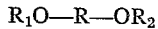

$R_3$ is a phenyl or alkyl radical, preferably an alkyl radical containing a maximum of 8 carbon atoms, and R is a divalent hydrocarbon radical, which is the nucleus of an organic dihydroxy compound. Particularly suitable organic dihydroxy compounds are aliphatic, cycloaliphatic, aromatic dihydroxy compounds.

Exemplary of the particularly suitable aliphatic dihydroxy compounds are alkane diols such as ethylene glycol, 1,3-propanediol, 1,4-butanediol, 1,5-pentanediol, 1,6-hexanediol, 1,8-octanediol, 1,10-decanediol, 1,3-butanediol, 2-methyl-1,3-propanediol, 2-ethyl-1,3-propanediol, 2-ethyl-1,6-hexanediol, 2,2-dimethyl-1,3-propanediol, 3-methyl-1,5-pentanediol, 2-methoxymethyl-2,4-dimethyl-1,5-pentanediol, 2,5-dimethyl-1,5-pentanediol and the like; and the polyoxyalkylene glycols such as diethylene glycol, triethylene glycol, tetraethylene glycol, dipropylene glycol, tripropylene glycol, tetrapropylene glycol, dibutylene glycol, tributylene glycol and the like. Especially preferred aliphatic dihydroxy compounds are those having the formulae:

$$HO(CH_2)_aOH$$

or $$HOR_4(OR_4)_bOH$$

where $a$ and $b$ are integers of from 1 to 10 inclusive and $R_4$ is an alkylene radical containing from 2 to 4 carbon atoms inclusive, that is, an ethylene, propylene or butylene radical.

Esters of any of the above-named aliphatic dihydroxy compounds can also be used. Especially preferred esters are the mono- or dialkyl esters or the mono- or diphenyl esters such as the monomethyl, monoethyl, monobutyl, monohexyl, monooctyl, monodecyl, dimethyl, diethyl, dihexyl, dioctyl, didodecyl, monophenyl, monochlorophenyl, mono(dichlorophenyl), mono(4-methylphenyl), diphenyl, methyl ethyl, ethyl phenyl, ethyl hexyl, methyl dodecyl or chlorophenyl methyl esters of any of the above-named aliphatic dihydroxy compounds.

The linear amorphous polyesters of this invention which are prepared from the especially preferred aliphatic dihydroxy compounds or esters mentioned above have a plurality of recurring structural units of the formulae:

Formula III

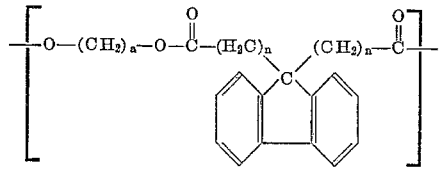

and

Formula IV

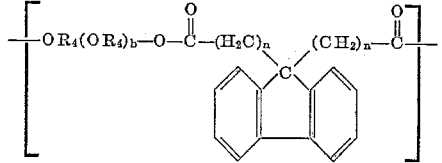

where $R_4$ $a$, $b$ and $n$ are as previously defined.

Cycloaliphatic dihydroxy compounds or esters thereof which can be used for the production of the linear amorphous polyesters of this invention include cyclopentanediols; cyclohexanediols such as 1,4-cyclohexanediol, 1,3-cyclohexanediol and 1,2-cyclohexanediol; dihydroxydecahydronaphthalenes such as 2,6-dihydroxydecahydronaphthalene and the like; and other like compounds; and the mono- or diesters of such compounds including any of the monoalkyl, dialkyl, monophenyl, diphenyl or alkyl phenyl esters mentioned above with regard to the aliphatic dihydroxy compounds.

Aromatic dihydroxy compounds or esters of the same that are suitable for the preparation of the linear amorphous polyesters of this invention include mononuclear and polynuclear dihydroxy phenols or esters thereof. Suitable mononuclear phenols are those compounds having the general formula:

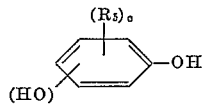

where $R_5$ represents halogen, including fluorine, chlorine, bromine or iodine; or an alkyl radical such as methyl, ethyl, n-hexyl, n-octyl and the like, preferably alkyl radicals containing a maximum of 8 carbon atoms; or an alkoxy radical such as methoxy, ethoxy, ethoxyethyl, butoxy, hexoxy and the like, preferably an alkoxy radical containing a maximum of 8 carbon atoms; and $c$ represents a positive integer of from 0 to 4 inclusive. Representative examples of such mononuclear phenols are hydroquinone, resorcinol, catechol, dihydroxytoluenes, dihydroxy xylylenes, dihydroxy mesitylenes, dihydroxy-durenes, thymoquinol, 3-chloro-4-hydroxyphenol, 2-methoxy-3-chloro-4-hydroxyphenol, 2,4-diethyl-3hydroxyphenol, 2,5-dimethyl-3,6-dichloro-4-hydroxyphenol and the like. Also suitable are methylolated mononuclear phenols such as ortho-, meta-, and para-hydroxybenzylalcohol, dimethylolbenzenes, dimethyloltoluenes and the like. It is to be understood that the mono- and di-alkyl or phenyl esters of the above mononuclear phenols can also be used.

Polynuclear aromatic dihydroxy compounds which can be used to prepare the linear amorphous polyesters of this invention include such compounds as 4,4'-dihydroxydiphenyl, 2,2'-dihydroxydiphenyl, 1,4-dihydroxynaphtha-lene, 1,6-dihydroxynaphthalene, 2,6-dihydroxynaphtha-lene and the like; dihydroxyanthracenes; and other like compounds. Preferred polynuclear aromatic dihydroxy compounds are the bisphenols having the general formula:

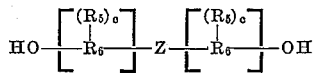

where $c$ and $R_5$, which can be the same or different, are as previously defined; $R_6$ is a phenylene or naphthylene radical, preferably phenylene, and $Z$ is a divalent radical including, for example,

or —O—, or —S—, or —SO—, or —SO$_2$—, or —S—S—, or a divalent hydrocarbon radical including for example alkylene radicals such as methylene, ethylene, trimethylene, tetramethylene, hexamethylene, 2-ethylhexamethylene, octamethylene, nonamethylene, decamethylene, and the like; alkylidene radicals such as ethylidene, propylidene, butylidene, amylidene, 1-phenylethyli-dene and the like; cycloalkylene radicals such as 1,4-cyclohexylene, 1,3-cyclohexylene, cyclohexylidene and the like; halogenated alkylidene, alkylene, or cycloalkylene radicals; alkoxy or aryloxy substituted alkylidene, alkylene, or cycloalkylene radicals such as methoxymethylene, ethoxymethylene, ethoxyethylene, 2-ethoxytrimethylene, 3-ethoxypentamethylene, 2-methoxy-1,4-cyclohexylene, phenoxyethylene, 2-phenoxytrimethylene, 2-phenoxy-1,3-cyclohexylene, and the like; aralkylene radicals such as phenylethylene, 2-phenyltrimethylene, 1-phenylpenta-methlene, 2-phenyldecamethylene and the like; arylene radicals such as phenylene, naphthylene and the like; halogenated arylene radicals such as 2-chloro-1,4-phenylene, 2-bromo-1,4-phenylene, 2-fluoro-1,4-phenylene and the like; alkoxy and aryloxy substituted arylene radicals such as 2-methoxy-1,4-phenylene, 2-ethoxy-1,4-phenylene, 2-propoxy-1,4-phenylene, 2-phenoxy-1,4-phenylene and the like; alkaryl radicals such as 2-methyl-1,4-phenylene, 2-ethyl-1,4-phenylene, 2-propyl-1,4-phenylene, 2-butyl-1,4-phenylene, 2-dodecyl-1,4-phenylene and the like; polyalkoxy radicals such as polyethoxy, polypropoxy, polybutoxy, polyphenyl-ethoxy and the like; or can be a radical containing a silicon atom such as polydimethylsiloxy, polydiphenylsiloxy, polymethylphenylsiloxy and the like; or can be two or more alkylene or alkylidene radicals separated by an aromatic ring, a tertiary amino group, an ether linkage, a carboxyl group or separated by a linkage containing sulfur such as —S—, —SO—, or —SO$_2$— and the like.

Specific illustrative examples of polynuclear phenols suitable for the preparation of the polyesters of this invention are 2,2'-dihydroxybenzophenone, 2,4'-dihydroxybenzophenone, 4,4'-dihydroxybenzophenone and the like; bis-(4-hydroxyphenyl)-ether, the 4,3'-, 4,2'-, 2,2'-, 2,3'- and 3,3'-dihydroxydiphenyl ethers, 4,4'-dihydroxy-2,6-dimethyldiphenyl ether, bis-(4-hydroxy-3-isopropylphenyl) ether, bis-(4-hydroxy-3-chlorophenyl)ether, bis-(4-hydroxy - 3 - fluorophenyl)ether, bis-(4-hydroxynaphthyl) ether, bis-(4-hydroxy-3-chloronaphthyl)ether, 4,4'-dihydroxy-2,6-dimethoxydiphenyl ether, 4,4'-dihydroxy-2,5-diethoxydiphenyl ether and the like; and bis-(4-hydroxyphenyl)sulfide, bis - (4-hydroxy-2-methylphenyl)sulfide, bis-(2-hydroxyphenyl)sulfide and the like.

Especially preferred polynuclear dihydroxy aromatic compounds are the bis-(hydroxyphenyl)-alkanes and bis-(hydroxyphenyl)-sulfones of the general formula:

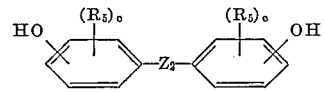

where $R_5$ is as previously defined, $c$ is a positive integer of from 0 to 4 inclusive, and $Z_2$ is

or an alkylene or an alkylidene radical, each preferably having from 1 to 9 carbon atoms inclusive.

Specific illustrative examples of the especially preferred bis(hydroxyphenyl)-alkanes and bis-(hydroxypheynl)-sulfones are 2,2-bis-(para-hydroxyphenyl)-propane (commonly referred to as bisphenol-A), 2,4'-dihydroxydiphen-yl methane, bis-(2-hydroxy-phenyl)-methane, bis-(4-hydroxyphenyl) - methane, bis-(4-hydroxy-2,6-dimethyl-3-chlorophenyl) - methane, bis-(4-hydroxy-2,6-dimethoxy-phenyl)-methane, 1,1-bis-(4-hydroxyphenyl)-ethane, 1,2-bis-(4-hydroxyphenyl)-ethane, 1,1-bis-(4-hydroxy-3-chlorophenyl)-ethane, 1,1-bis-(3,5-dimethyl-4-hydroxyphen-yl)-ethane, 1,3-bis-(3-ethoxy-4-hydroxyphenyl)-propane, 2,2-bis-(3-butoxy-4-hydroxyphenyl)-propane, 2,2-bis-(3-isopropyl-4-hydroxyphenyl)-propane, 2,2-bis-(4-hydroxyphenyl)-pentane, 3,3-bis-(4-hydroxyphenyl)-pentane, 2,2-bis-(4-hydroxyphenyl)-heptane, 1,2-bis-(4-hydroxyphen-yl)-1,2-bis-(ethoxy)-propane and the like; and bis-(4-hydroxyphenyl)-sulfone, 2,4'-dihydroxydiphenyl sulfone, 5'-chloro-2,4'-dihydroxydiphenyl sulfone, 5'-chloro-4,4'-dihydroxydiphenyl sulfone and the like. Numerous other examples of bis-(hydroxyphenyl)-alkanes and bis-(hydroxyphenyl)sulfones that can be used in this invention are shown in Bowman et al., U.S. Patent 2,829,175 (issued April 1, 1958), and Pielstocker et al., U.S. Patent 2,964,-797 (issued December 20, 1960), the disclosures of each of which are incorporated herein by reference. It is again to be understood that the mono- and di-alkyl or phenyl esters of any of the above described polynuclear aromatic compounds can be used in this invention.

Linear, amorphous polyesters of this invention prepared from the preferred mononuclear dihydroxy phenols have a plurality of recurring structural units of the general formula:

Formula V

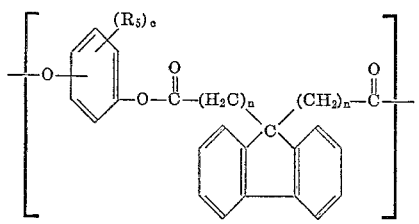

and linear amorphous polyesters of this invention prepared from the especially preferred polynuclear aromatic dihydroxy compounds, that is, the bis-(hydroxyphenyl)-alkanes and bis-(hydroxyphenyl)-sulfones, have a plurality of recurring structural units of the general formula:

Formula VI

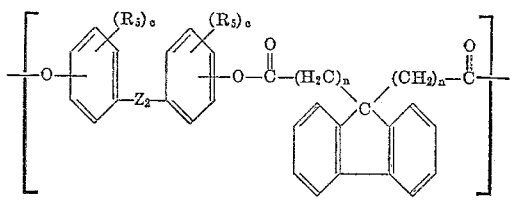

where, in each of Formulae V and VI, $R_5$, $Z_2$, $c$ and $n$ are as previously defined.

The 9,9-fluorenedicarboxylic acids or ester-forming derivatives of such acids which can be used in this invention are those compounds represented by the general formula:

Formula VII

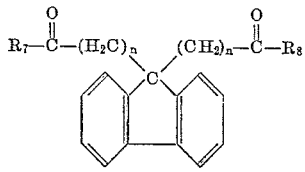

wherein $n$ is previously defined and $R_7$ and $R_8$, which can be the same or different, are hydroxyl, halogen, alkoxy or phenoxy radicals; or an anhydride of an acid having the general Formula VII above where $R_7$ and $R_8$ both are hydroxyl.

Specific acids having the general Formula VII above, wherein $R_7$ and $R_8$ are hydroxyl, and anhydrides thereof which are suitable for the practice of this invention are: 9,9-fluorenediacetic acid, 9,9-fluorenedi-n-propionic acid, 9,9-fluorenedi-n-butanoic acid, the anhydride of 9,9-fluorene-diacetic acid, the anhydride of 9,9-fluorenedi-n-propionic acid and the anhydride of 9,9-fluorenedi-n-butanoic acid.

Exemplary of compounds falling within the scope of Formula VII wherein either or both of $R_7$ and $R_8$ are halogen, that is, chlorine, bromine, iodine or fluorine, are the monochloride, mono-fluoride, mono-bromide and mono-iodide of 9,9-fluorenediacetic acid, of 9,9-fluorenedi-n-propionic acid, and of 9,9-fluorenedi-n-butanoic acid; the dichloride, difluoride, dibromide, and the diiodide of the above-named acids; and the mixed dihalides of said acids, that is, those dihalide compounds where $R_7$ and $R_8$ are different halogens.

Illustrative of compounds included within the scope of Formula VII above, wherein either one or both of $R_7$ and $R_8$ are alkoxy or phenoxy, which can be reacted to produce the polyesters of this invention are those where $R_7$ and/or $R_8$ represent radicals such as phenoxy, phenylphenoxy, methylphenoxy, chlorophenoxy, dichlorophenoxy, methoxy, ethoxy, n-propoxy, isopropoxy, n-butoxy, isobutoxy, sec-butoxy, n-amoxy; n-hexoxy, 2-ethylhexoxy, n-octoxy, n-nonoxy, n-dodecoxy, n-octadecoxy and the like. Specific compounds which can be noted are monoesters, such as the monophenyl, monochlorophenyl, mono (dichlorophenyl), mono(4-methylphenyl), monomethyl, monoethyl, mono-n-propyl, mono-n-hexyl, mono-n-dodecyl, and mono-n-octadecyl esters of 9,9-fluorenediacetic, 9,9-fluorenedi-n-propionic or 9,9-fluorenedi-n-butanoic acid; diesters, such as the diphenyl, dimethyl, diethyl, di-n-propyl, di-n-buyl, di-n-dodecyl, and the di-n-octadecyl esters of the above-named acids, as well as the mixed diesters such as the methyl phenyl, methyl ethyl, methyl n-propyl, ethyl phenyl, ethyl n-hexyl, and methyl n-dodecyl esters of 9,9-fluorenediacetic, 9,9-fluorenedi-n-propionic or 9,9-fluorenedi-n-butanoic acids. Preferred esters are the monomethyl, dimethyl, monophenyl and diphenyl esters.

Other suitable compounds included within the general Formula VII above which can be used to produce the linear, amorphous thermoplastic polyesters of this invention are the mixed ester-halides of 9,9-fluorenedicarboxylic acids, that is, those compounds illustrated by the general Formula VII above wherein $R_7$ is a halogen, including fluorine, chlorine, bromine or iodine, and $R_8$ is a phenoxy or alkoxy radical including those alkoxy radicals listed immediately above. An illustrative example of these compounds is the methyl ester of the monoacid chloride of 9,9-fluorenedi-n-propionic acid.

Analysis of the polyesters of this invention in accodance with well known methods, such as by study of their respective X-ray diffraction patterns, reveals no measurable amount of crystallinity. As compared to currently known crystalline polyesters they have lower melting points and lower flow points. Consequently the polyesters of this invention are much more readily fabricated into films, molded articles and the like than the presently known crystalline polyesters.

The polyesters of this invention, as compared to known amorphous polyesters, have significantly better tensile strength and tensile impact strength, and have higher softening points. Furthermore the linear amorphous polyesters of this invention have excellent thermal stability as evidenced by relatively high heat distortion temperatures and by retention of toughness and dimensional stability at temperatures greater than 100° centigrade. As a result, the polyesters of this invention are particularly suitable for use as extrusion and injection molding materials.

Furthermore, films, sheets and molded plaques prepared from the polyesters disclosed herein have excellent gloss and excellent transparency. These polyesters are thus particularly suitable for use in the manufacture of bottles, packaging films, and the like.

The condensation polymerization reaction which results in the linear amorphous polyesters of this invention can be illustrated by the following equation wherein the starting materials are represented by the general formula:

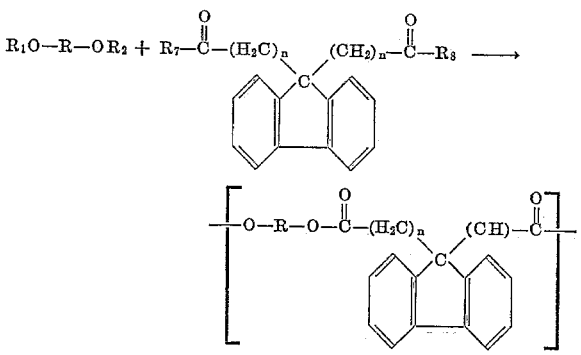

where R, $R_1$, $R_2$, $R_7$, $R_8$ and $n$ are as previously defined.

The condensation polymerization reaction can be conducted using various amounts of organic dihydroxy compound or ester thereof and of 9,9-fluorenedicarboxylic acid starting material. Generally the organic dihydroxy compound or ester thereof is used in an amount ranging from about 5 percent to about 500 percent in excess of stoichiometric. Preferably the organic dihydroxy compound or ester thereof is used in an amount ranging from about 0.1 percent to about 100 percent in excess of stoichiometric. In determining stoichiometric amounts each hydroxyl (—OH) and/or each ester

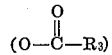

group in the organic dihydroxy compound or ester thereof is considered to react with one carbonyl

group in the 9,9-fluorenedicarboxylic acid starting material.

If desired, the polymerization reaction can be conducted in contact with an inert liquid diluent. Such diluent, when used, must be non-reactive with the starting materials and with the polyester product. The inert liquid diluent may be a solvent for the starting materials, for the polyester product, or both; as desired. Thus, it is possible to conduct the polymerization reaction using an inert liquid diluent which is a solvent for the starting materials and a non-solvent for the polyester product; or to conduct the polymerization reaction using an inert liquid diluent which is a solvent for the polyester only. Suitable inert liquid diluents which can be used include the aromatic hydrocarbons such as benzene, toluene, xylene and the like; chlorinated aromatic hydrocarbons such as chlorobenzene and the like; aliphatic hydrocarbons such as n-hexane, n-heptane and the like; halogenated aliphatic hydrocarbons such as dichloromethane, tetrachloroethane and the like; ethers such as diethyl ether of ethylene glycol, diethyl ether of 1,3-propylene glycol, dioxane and the like. Other suitable diluents include acetone, high-boiling petroleum hydrocarbons and the like. Suitable diluents to be used for any specific mode of operation will be obvious to those skilled in the art.

The polymerization reaction is generally conducted at atmospheric pressure, although superatmospheric or subatmospheric pressures can be used if so desired.

Temperatures employed for the polymerization reaction can also vary over a wide range, generally from about 150° centigrade to about 325° centigrade. The temperature range chosen will vary in accordance with particular reactants and reaction pressures and with the specific mode of operation chosen, as more fully described below. It is usually desirable and generally preferable to provide in the reaction zone an atmosphere of a dry, inert gas. Suitable inert dry gases for this purpose include for example nitrogen, helium, argon, hydrogen and the like. It is preferred to use nitrogen or argon.

The condensation polymerization reaction can be conducted with or without the addition of a catalyst, as desired. The use of a catalyst is preferred however in order to shorten the reaction time and thus minimize any possibility of discoloration. Any of the well-known polyesterification catalysts can be used. Examples of suitable catalysts are zinc chloride, zinc acetate, lead oxide, antimony oxide, manganese acetate, cobaltous acetate, zinc succinate, zinc borate, magnesium methoxide, sodium methoxide, barium oxide, cadmium formate, dibutyltin oxide, tetraisopropyl titanate, calcium titanium silicate and the like. Preferred catalysts are zinc salts, particularly those mentioned above. The amounts of catalyst used can be varied from about 0.001 percent to about 1 percent by weight of the 9,9-fluorenedicarboxylic acid starting material with an amount in the range of from about .01 percent to about 1.0 percent by weight being preferred.

Recovery of the linear amorphous polyester product from the reaction mixture is readily accomplished by conventional methods. For example, when a diluent is used which is a solvent for the starting materials and a non-solvent for the polyester product, the polyester can be recovered as a precipitate from the reaction mixture. Similarly, when the condensation polymerization reaction is conducted with the use of a diulent which is a solvent for the polyester product, the polyester may be recovered by precipitation followed by conventional filtration, centrifugation, milling or decantation methods. When no diulent is used, the polyester can be recovered simply by heating the reacted mixture under a partial vacuum, generally at about 0.01 to about 100 millimeters of mercury (absolute) at a temperature and for a time sufficient to volatilize any by-products and any unreacted starting materials. When using this latter recovery procedure, the temperature is usually maintained below about 325° centigrade.

Other materials can be present in the reaction mixture if desired; for example: color inhibitors such as alkyl or aryl phosphite esters; pigments or fillers such as titanium dioxide or barium carbonate; and/or any of the well-known viscosity stabilizers such as monobasic acids, monoalcohols, monoamines such as acetic acid, 2-ethylhexanol, and n-butylamine.

Various specific modes of operation can be used in conducting the polymerization reaction of this invention. One mode comprises adding to a mixture of 9,9-fluorenedicarboxylic acid and a cataylst, an amount of organic dihydroxy compound in the range of from about 105 percent to 600 percent of stoichiometric, and heating to a temperature of from about 150 to about 200° centigrade while blanketing the reaction mass with nitrogen. Under these conditions the water produced as a by-product will be distilled from the reaction zone. When the reaction has proceeded to substantial completion, indicated by the cessation of the distillation of water from the reaction mass, the temperature is raised to within the range of from about 240° to about 325° centigrade and the pressure reduced to within the range of from about 0.05 to about 0.1 millimeter of mercury in order to distill out the excess oragnic diol, and to produce a tough, amorphous polyester.

In another specific mode of operation a 9,9-fluorenedicarboxylic acid diester is simply mixed with a catalyst and a stoichiometric excess of an organic dihydroxy compound or ester thereof; and the resulting mixture heated to temperatures sufficient to distill out the low boiling alcohol or ester by-product liberated.

In another specific mode of operation a dihalide of 9,9-fluorenedicarboxylic acid is reacted with an excess of an aliphatic dihydroxy compound at temperatures sufficient to distill off the hydrogen halide by-product, after which the polyester product mass is heated at a temperature in the range of from about 225° centigrade to about 325° centigrade and at a pressure of from about 5.0 to about 0.1 mm. Hg to distill out the excess aliphatic dihydroxy compound.

The 9,9-fluorenedicaroxylic acid starting materials used in this invention can be prepared by methods known to the art. One method of preparing 9,9-fluorenedipropionic acid is by cyanoethylation of fluorene followed by saponification and acidification of the cyanoethyl derivative. This method is more fully described in Bruson, U.S. Patent 2,280,052, issued April 21, 1942; which is incorporated herein by reference thereto.

The compound 9,9-fluorenediacetic acid can be prepared by cyanomethylation of fluorene through reaction with formaldehyde and hydrogen cyanide, followed by saponification and acidification as described in Bruson, U.S. Patent 2,280,058; mentioned above.

There are several methods of preparing 9,9-fluorenedibutanoic acid. The simplest method is by direct oxidation of 9,9-bis-(4-hydroxybutyl)-fluorene. The compound 9,9-bis-(4-hydroxybutyl)-fluorene is described in Chemical Abstracts, vol. 44, page 5854 (1950). Another method of preparing 9,9-fluorenedibutanoic acid is by reacting 1 mole fluorene with 2 moles allyl bromide ($CH_2$=$CHCH_2Br$) to produce 9,9-bis(3-bromopropyl)-fluorene, which can then be reacted with an alkali metal cyanide, such as sodium cyanide, to produce 9,9-bis-(3-cyanopropyl)-fluorene. The cyanopropyl derivative can then be saponified and acidified as described in Bruson, U.S. Patent 2,280,058, to produce 9,9-fluorenedibutanonic acid.

The following specific examples will further illustrate the present invention. These examples are merely illustrative and should not be construed as limiting the invention other than as defined in the appended claims. In the examples all parts are parts by weight unless otherwise specified.

EXAMPLE 1

*Condensation polymerization of 9,9-fluorenedipropionic acid and ethylene glycol*

Eighty parts of 9,9-fluorenedipropionic acid and 60 parts of ethylene glycol were placed in a glass reaction vessel equipped with a stirrer, a short distillation column and an inlet for purified dry nitrogen. Zinc chloride (0.5 part) was added to serve as a catalyst. The mixture was then stirred and heated to a temperature in the range of from about 190° centigrade to about 200° centigrade while pure dry nitrogen was bubbled therethrough. Water, produced as a by-product of the reaction, was continuously distilled off. After about two hours the evolution of water ceased, indicating that the condensation reaction had gone to completion. Some of the excess glycol was then distilled off at atmospheric pressure by raising the temperature to within the range of from about 260° centigrade to about 270° centigrade and maintaining these conditions for about 20 to about 60 minutes. A vacuum of about 0.1 millimeter of mercury (absolute) was then applied to the reaction vessel while maintaining the temperature in the range of from about 260° centigrade to about 270° centigrade. Under these conditions the molten contents of the reaction vessel rapidly increased in viscosity and after about two to three hours became so viscous that stirring was no longer possible. At this point heating was discontinued, the vacuum was released, and the reaction vessel and contents therein were allowed to slowly cool to room temperature. The polyester product was recovered by breaking the glass reaction vessel and removing the product. When other types of reaction vessels are used the polyester can be recovered by extrusion under pressure through a valve at the bottom of the vessel.

The resulting poly(ethylene-9,9-fluorenedipropionate) was subjected to an X-ray diffraction pattern analysis and was found to have no measurable amount of crystallinity. This polyester was a hard, tough, clear solid and had a reduced viscosity at 25° centigrade of 0.52.

Infra-red analysis of the amorphous, thermoplastic polyester showed that it had recurring units of the formula:

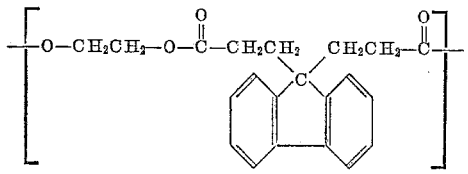

This linear amorphous polyester was readily soluble in dioxane, dichloromethane, trichloroethane and the like at room temperature. Solutions so prepared were spread on a glass surface, using a Boston-Bradley drawdown bar, and the resultant film was dried at room temperature for several hours. The film was then further dried at temperatures gradually increased from about 60° centigrade to about 100° centigrade over a period of several hours. Final drying was performed under vacuum at about 100° centigrade for about one to about two hours to insure complete volatilization of the solvent. The polyester film thus produced could be readily stripped from the glass surface upon which it had been spread. In this manner films ranging from 0.001 inch (1 mil) to 0.010 inch (10 mils) in thickness were prepared. Each of these films was transparent, flexible and tough and thus particularly suitable for use as packaging material.

Molded plaques of the poly(ethylene-9,9-fluorenedipropionate) were prepared by compression molding between two highly polished platens in a steam-heated hydraulic press at a temperature of about 210° centigrade and a pressure of about 2000 pounds per square inch. The plaques so prepared were about 0.075 inch (75 mils) thick. These plaques were found to be rigid and tough. Samples which were die cut therefrom were dimensionally stable in boiling water.

EXAMPLE 2

*Condensation polymerization of 9,9-fluorenedipropionic acid and hydroquinone diacetate*

Thirty-one parts of 9,9-fluorenedipropionic acid and 24 parts of hydroquinonediacetate were placed in a glass reaction vessel equipped with a stirrer, a short distillation column and an inlet tube for purified dry nitrogen. Zinc acetate (0.25 part) was added to serve as a catalyst. The mixture was then stirred and heated to a temperature in the range of from about 190° centigrade to about 200° centigrade while pure dry nitrogen was bubbled therethrough. Acetic acid, produced as a by-product of the reaction, was distilled off. After about two hours no more acetic acid was produced, indicating that the reaction had proceeded to substantial completion. The temperature was raised and maintained within the range of from about 270° centigrade to about 280° centigrade for one hour; after which the pressure was lowered to within the range of from about 0.05 to about 0.1 millimeter of mercury while maintaining the same temperatures. The reaction vessel was maintained under these latter conditions for a period of three hours, during which time excess hydroquinone diacetate was distilled off. At the end of this time period the product mass became too viscous to stir; the vacuum was released and the reaction vessel and contents were allowed to slowly cool to room temperature. The poly(1,4-phenylene-9,9-fluorenedipropionate) product was recovered in the same manner as described in Example 1. Analysis of this polyester showed that it had recurring units of the formula:

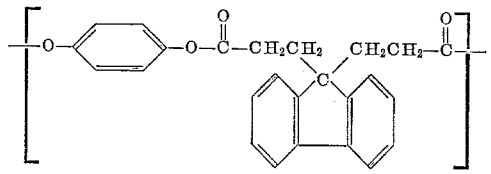

An X-ray difffraction patern analysis of the poly(1,4-phenylene-9,9-fluorenedipropionate) showed no measurable amount of crystallinity. The reduced viscosity of this polyester at 25° centigrade was 0.61. It could be fabricated into films, sheets and molded plaques which were found to be clear and extremely tough. Articles prepared from this polyester were dimensionally stable in boiling water.

EXAMPLE 3

*Condensation polymerization of 9,9 - fluorenedipropionic acid and 2,2-bis-(para-hydroxyphenyl)-propane*

By using the procedures described in Examples 1 and 2 above 9,9-fluorenedipropionic acid and the diacetate ester of 2,2-bis-(para - hydroxyphenyl) - propane were polymerized to produce poly[2,2-bis-(para-phenyl)-propane-9, 9-fluorenedipropionate] having recurring units of the formula:

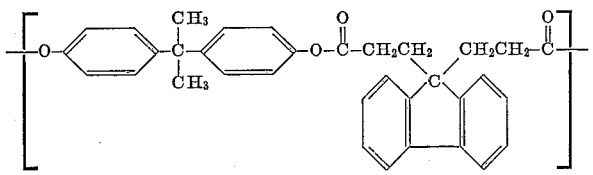

This polyester when subjected to an X-ray diffraction pattern analysis showed no measurable amount of crystallinity.

By using the procedures described in Examples 1, 2 and 3 above, one can also prepare other linear, amorphous polyesters from any of the organic dihydroxy compounds or esters thereof listed above and 9,9-fluorenediacetic acid, 9,9-fluorenedipropionic acid or 9,9-fluorenedibutanoic acid or the ester-forming derivatives of said acids. Exemplary of such polyesters are those containing a plurality of recurring structural units as noted below:

(a) the reaction product of ethylene glycol and 9,9-fluorenediacetic acid contains the following repeating unit,

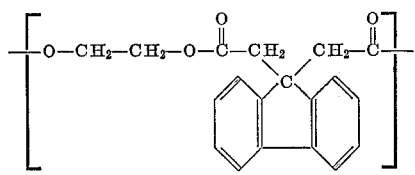

(b) the reaction product of 2,2-bis-(p-hydroxyphenyl)-propane and 9,9-fluorenediacetic acid contains the following repeating unit,

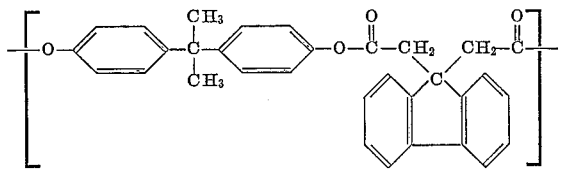

(c) the reaction product of 2,2-bis-(p-hydroxyphenyl)-propane and 9,9-fluorenedibutanoic acid contains the following repeating unit,

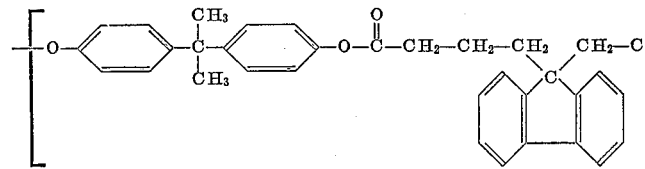

What is claimed is:

1. Linear, amorphous thermoplastic polyesters having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane, having heat distortion temperatures greater than 100° C. and consisting essentially of a plurality of recurring structural units of the general formula:

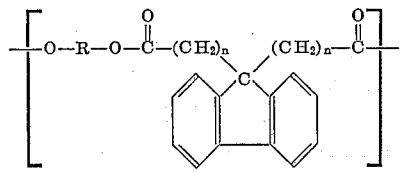

where $n$ is a positive integer of from 1 to 3 inclusive and R is a divalent hydrocarbon radical.

2. Linear, amorphous thermoplastic polyesters having a reduced viscosity of about 0.2 to about 3.5, said viscosity determined at 25° C. on a solution having a concentration of 0.2 gram of the polyester per 100 milliliters of a mixture of 60 percent by weight and 40 percent by weight tetrachloroethane, having heat distortion temperatures greater than 100° C. and consisting essentially of a plurality of recurring structural units of the general formula:

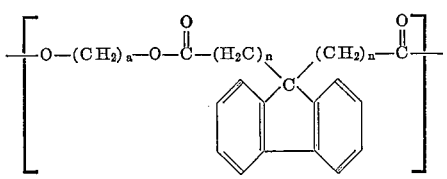

where $a$ is a positive integer of from 1 to 10 inclusive and $n$ is a positive integer of from 1 to 3 inclusive.

3. Linear, amorphous thermoplastic polyesters having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane, having heat distortion temperatures greater than 100° C. and consisting essentially of a plurality of recurring structural units of the general formula:

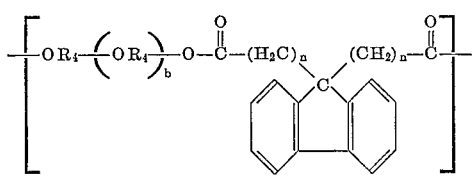

where $R_4$ represents an alkylene radical containing from 2 to 4 carbon atoms, $b$ is a positive integer of from 1 to 10 inclusive and $n$ is a positive integer of from 1 to 3 inclusive.

4. A linear, amorphous thermoplastic polyester having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane, having a heat distortion temperature greater than 100° C. and consisting essentially of a plurality of recurring structural units of the formula:

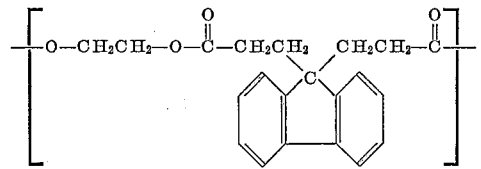

5. A linear, amorphous thermoplastic polyester having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane, having a heat distortion temperature greater than 100° C. and consisting essentially of a plurality of recurring structural units of the formula:

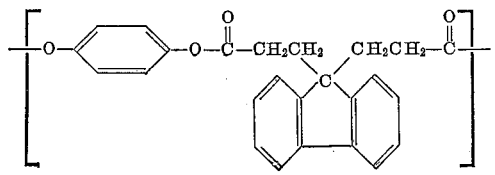

6. A linear, amorphous thermoplastic polyester having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane, having a heat distortion temperature greater than 100° C. and consisting essentially of a plurality of recurring structural units of the formula:

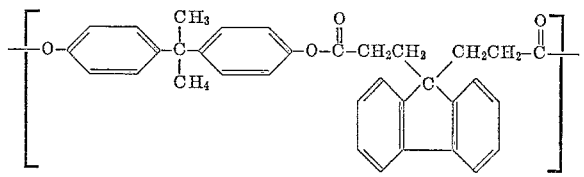

7. Process for the preparation of linear, amorphous thermoplastic polyesters having a reduced viscosity of about 0.2 to about 3.5, said viscosity determined at 25° C. on a solution having a concentration of 0.2 gram of the polyester per 100 milliliters of a mixture of 60 percent by weight phenol and 40 percent by weight tetrachloroethane and having heat distortion temperatures greater than 100° C., which comprises condensation polymerizing, at temperatures in the range of from about 150° C. to about 325° C., a starting material selected from the group of (a) compounds having the general formula:

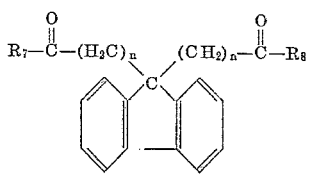

where $R_7$ and $R_8$ are selected from the group consisting of hyrdoxy, halogen, alkoxy and phenoxy radicals and $n$ is a positive integer of from 1 to 3 inclusive and (b) anhydrides of an acid having the general formula above where $R_7$ and $R_8$ are hydroxyl, with a compound, in an amount of from about 5 percent to about 500 percent in excess of stoichiometric, of the general formula:

$$R_1O—R—OR_2$$

where $R_1$ and $R_2$ are selected from the group consisting of hydrogen and

radicals, $R_3$ being selected from the group consisting of phenyl and alkyl radicals, and where R is a divalent hydrocarbon radical, for a sufficient period of time to produce said thermoplastic polyesters.

References Cited by the Examiner
UNITED STATES PATENTS

| | | | |
|---|---|---|---|
| 2,339,218 | 1/1944 | Bruson | 260—75 |
| 2,680,722 | 5/1952 | Anderson | 260—75 |
| 2,956,974 | 10/1960 | De Witt | 260—75 |
| 3,096,358 | 7/1963 | Horn | 267—75 |

FOREIGN PATENTS

| | | |
|---|---|---|
| 141,487 | 1961 | Russia. |

WILLIAM H. SHORT, *Primary Examiner.*

HAROLD W. BURNSTEIN, LOUISE P. QUAST, *Examiners.*